United States Patent

[11] 3,599,960

| [72] | Inventor | John R. Phillips<br>12219 S. 71st St., Tempe, Ariz. 85281 |
|---|---|---|
| [21] | Appl. No. | 832,574 |
| [22] | Filed | June 12, 1969 |
| [45] | Patented | Aug. 17, 1971 |

[54] SCREW CLAMP
2 Claims, 4 Drawing Figs.

| [52] | U.S. Cl. | 269/182 |
|---|---|---|
| [51] | Int. Cl. | B25b 1/12, B25b 5/10 |
| [50] | Field of Search | 269/181, 182, 183 |

[56] References Cited
UNITED STATES PATENTS

| 150,900 | 5/1874 | Silver | 269/182 |
|---|---|---|---|
| 2,461,687 | 2/1949 | Hopfeld | 269/182 X |
| 2,463,263 | 3/1949 | Gordon | 269/182 X |

*Primary Examiner*—Andrew R. Juhasz
*Assistant Examiner*—Donald D. Evanson
*Attorney*—Willard L. Groene

ABSTRACT: A screw clamp having a threadably mounted clamping spindle provided with a quick-release segmental nut device for rapid coarse adjustment with respect to a workpiece.

PATENTED AUG 17 1971

3,599,960

INVENTOR.
JOHN R. PHILLIPS
BY
Willard S. Grow
ATTORNEY

SCREW CLAMP

BACKGROUND OF THE INVENTION

1. The field of the invention lies in clamping mechanisms, and more particularly in a screw clamp having a quick-release mechanism to provide coarse adjustment thereof.

2. Heretofore, rapid coarse adjustments of screw clamps or C-clamps have been accomplished by elaborate mechanisms incorporating pivotally mounted segmental nut members, lever, cam devices and the like, which have been awkward to handle and expensive to manufacture. Many prior devices have utilized acme threads on the clamping spindle, the included angle between the apices of this type of thread was not highly suited to this application, as the axial forces exerted on the spindle by a workpiece under compression tends to loosen the spindle and disengage cam or other pivotally mounted segmental nut devices. To overcome this problem, elaborate and costly locking devices were required.

A particular prior art device utilized a segmental nut device pivotally mounted in a channel formed in the spindle mounting arm of the frame. Forming the channel in the arm weakened the frame, and the device relied on the warping of the frame under load to provide the necessary locking feature. This device was limited in its application, for it could be used only on workpieces capable of withstanding high clamping pressures.

SUMMARY OF THE INVENTION

One object of this invention is to provide a quick-adjusting screw clamp which is easy to operate and inexpensive to manufacture.

Another object is to provide a quick-adjusting screw clamp that is self-locking to resist axial forces exerted by a workpiece under compression.

Another object is to provide a quick-adjusting screw clamp for use on fragile as well as rugged workpieces.

A still further object is to provide the above mentioned mechanism which utilizes a rapidly adjustable clamping spindle and segmental nut member provided with mating buttress threads, the segmental nut member being perpendicularly mounted with respect to the spindle and normally biased into threaded engagement therewith. The segmental nut member is slidably disengageable by actuation of a release button.

DESCRIPTION OF THE PREFERRED EMBODIMENT

Figure 1:
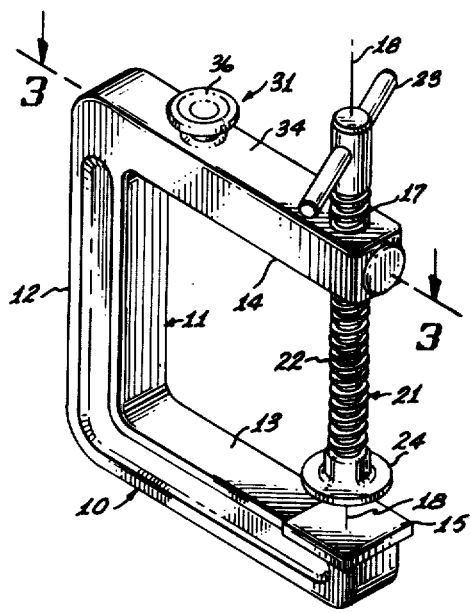
FIG. 1 is an isometric view of a screw clamp incorporating the features of this invention.
Figure 2:
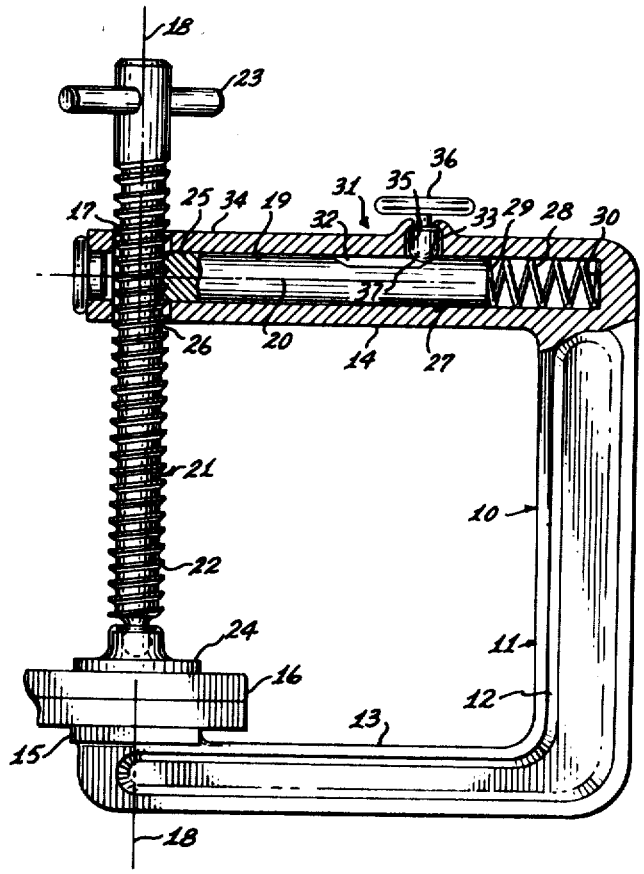
FIG. 2 is an enlarged side view partly broken away to show the segmental nut member and release mechanism of the present invention.
Figure 3:
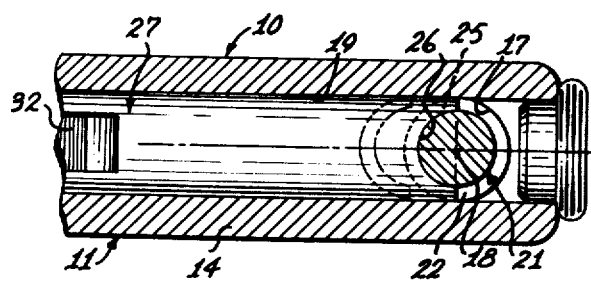
FIG. 3 is an enlarged fragmentary view taken on the line 3-3 of FIG. 1.

As an example of one embodiment of this invention, there is shown in FIGS. 1 and 2 a screw clamp 10 having a C-shaped frame 11 with an intermediate body portion 12 which is provided with a lower arm 13 and an upper arm 14. The arms 13 and 14 are spatially arranged from each other and extend outwardly from opposite ends of the body 12, and are in substantially parallel relationship with each other. The lower arm 13 is provided with the usual anvil 15 positioned to accept a workpiece 16. The upper arm 14 is provided with a smooth spindle mounting bore 17 having an axis 18 which intersects anvil 15 of lower arm 13. The upper arm 14 is also provided with a smooth plunger mounting bore 19 having an axis 20 which intersects and is substantially perpendicular to axis 18 of spindle bore 17.

A clamping spindle 21 having a male buttress thread 22 formed thereon is axially slidably mounted within the spindle bore 17. The clamping spindle 21 is provided with the usual handle 23 and flexibly mounted head 24.

A female buttress thread segmental nut portion is formed on one end 26 of plunger 27 and is axially reciprocatably mounted within plunger bore 19. Plunger 27 is normally biased into threaded engagement with the clamping spindle 21 by a compression spring 28 mounted between the opposite end 29 of plunger 27 and the bottom surface 30 of plunger bore 19.

As best seen in FIG. 2, the threaded engagement of the male buttress thread 22 of spindle 21 and the female buttress thread 25 of plunger 27 provides a large mating area of the flat portions of the threads. This feature is employed to assure that the axial forces exerted by the workpiece 16 when it is under compression are not transmitted into forces which would tend to disengage the plunger 27.

To disengage the plunger 27 from the clamping spindle 21, a release means 31 is provided in upper arm 14. The release means comprises an upwardly facing channel 32 formed in plunger 27, the channel 32 being provided with an angularly upwardly extending incline plane surface 33. The upper arm 14 is provided with a top surface 34 having a release button bore 35 formed therein in which a slidably mounted release button 36 is suitably retained. The release button 36 is provided with a downwardly depending shank 37 which extends into channel 32 and is engageable with incline plane surface 33. To disengage the plunger 27 from the clamping spindle 21, the release button 36 is depressed which exerts a force on the incline plane surface 33 causing the plunger 27 to move in the direction of the spring 28.

Figure 4:
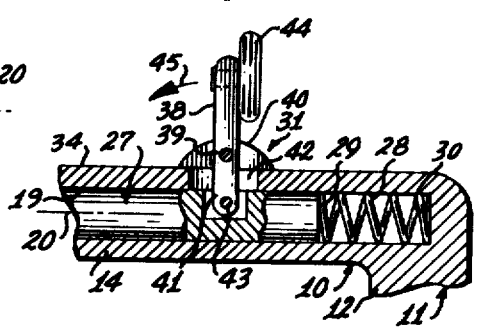
FIG. 4 is a fragmentary sectional side view illustrating a modification of the present invention.

FIG. 4 illustrates the release means 31 as a lever 38 pivotally mounted intermediate its ends by a pin 39 carried in a yolk 40 mounted on top surface 34 of the upper arm 14. The lower end 41 of lever 38 extends through a slot 42 formed in the top surface 34 and is pivotally mounted by a pin 43 carried in the plunger 27. The upper end of lever 38 is provided with a button 44 which when pressed in the direction of the arrow 45 forces the plunger 27 in the direction of the spring 28.

I claim:

1. A screw clamp comprising in combination:
   A. a body,
   B. a lower arm extending outwardly from one end of said body, and having an anvil formed thereon,
   C. an upper arm extending outwardly from the opposite end of said body, said upper arm spatially arranged from said lower arm and substantially parallel thereto,
   D. a spindle bore formed in said upper arm, and arranged therein so that the axis of said spindle bore intersects said anvil,
   E. a spindle axially slidable in said spindle bore, said spindle having a male buttress thread formed thereon,
   F. a plunger bore formed in said upper arm and arranged therein so that the axis of said plunger bore intersects the axis of said spindle bore and is perpendicular thereto, said plunger bore having a bottom surface,
   G. a plunger reciprocatably mounted within said plunger bore, said plunger having a female buttress thread formed on one end thereof,
   H. biasing means for yieldingly urging said plunger into threaded engagement with said spindle, said biasing means mounted between the opposite end of said plunger and the bottom surface of said plunger bore,
   I. and release means arranged on the upper arm and in engagement with said plunger for disengaging said plunger from said spindle,
   J. said release means includes an upwardly facing channel formed in said plunger, said channel having an angularly upwardly extending incline plane surface, a release button bore formed in the top surface of said upper arm, and a release button slidably retained in said release button bore, said release button having a downwardly depending shank engageable with said incline plane surface.

2. A screw clamp as set forth in claim 1 wherein said release means comprises a slot formed in the top surface of said upper arm, a yoke mounted on the top surface of said upper arm, and a lever pivotally mounted intermediate its ends on said yoke, the lower end of said lever extending through said slot, the lower end of said lever being pivotally mounted to said plunger.